(12) United States Patent
Kaneko et al.

(10) Patent No.: US 10,281,098 B2
(45) Date of Patent: May 7, 2019

(54) ILLUMINATION APPARATUS

(71) Applicant: MAXELL, LTD., Kyoto (JP)

(72) Inventors: Kazuomi Kaneko, Ibaraki (JP); Chohei Ono, Kyoto (JP); Nobuyuki Kaku, Kyoto (JP); Takuya Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/565,712

(22) PCT Filed: Apr. 16, 2015

(86) PCT No.: PCT/JP2015/061736
§ 371 (c)(1),
(2) Date: Oct. 11, 2017

(87) PCT Pub. No.: WO2016/166869
PCT Pub. Date: Oct. 20, 2016

(65) Prior Publication Data
US 2018/0073695 A1 Mar. 15, 2018

(51) Int. Cl.
*G03B 21/14* (2006.01)
*F21V 33/00* (2006.01)
(Continued)

(52) U.S. Cl.
CPC .............. *F21S 8/04* (2013.01); *F21V 21/02* (2013.01); *F21V 23/023* (2013.01);
(Continued)

(58) Field of Classification Search
CPC ...... G03B 21/145; G03B 21/20; G03B 29/00; F21S 8/04; F21V 21/02; F21V 33/0052
See application file for complete search history.

(56) References Cited

U.S. PATENT DOCUMENTS

| 2013/0163232 A1 | 6/2013 | Kasuga |
| 2014/0198949 A1* | 7/2014 | Garlington ............ G03B 21/10 382/103 |
| 2014/0307471 A1 | 10/2014 | Yokosawa |

FOREIGN PATENT DOCUMENTS

| JP | 55-100603 A | 7/1980 |
| JP | 05-249409 A | 9/1993 |

(Continued)

OTHER PUBLICATIONS

International Search Report of PCT/JP2015/061736 dated Jun. 2, 2015.

*Primary Examiner* — Ryan D Howard
(74) *Attorney, Agent, or Firm* — Mattingly & Malur, PC

(57) ABSTRACT

The present invention provides an illumination apparatus having a video projection function capable of more favorably moving and adjusting a position on which a video is projected even after the apparatus is set. The illumination apparatus is an illumination apparatus which is held by a holding tool for fixing to a ceiling surface or a wall and which emits illumination light, and includes: a light source arranged inside a housing for generating the illumination light; a diffusion plate attached to a part of the housing, the diffusion plate diffusing the illumination light from the light source; a projector which is arranged inside a space formed by the housing and a part of the diffusion plate and which projects a video onto a projection surface; and movement means for making the whole or a part of the projector movable in a direction parallel to the projection surface.

10 Claims, 19 Drawing Sheets

(51) Int. Cl.
*F21S 8/04* (2006.01)
*F21V 21/02* (2006.01)
*F21V 23/02* (2006.01)
*F21V 8/00* (2006.01)
*H05B 37/02* (2006.01)
*G03B 29/00* (2006.01)
*F21Y 115/10* (2016.01)
*F21Y 103/33* (2016.01)

(52) U.S. Cl.
CPC ........ *F21V 33/0052* (2013.01); *G02B 6/0043* (2013.01); *G02B 6/0083* (2013.01); *G03B 21/14* (2013.01); *G03B 21/145* (2013.01); *G03B 29/00* (2013.01); *H05B 37/02* (2013.01); *F21Y 2103/33* (2016.08); *F21Y 2115/10* (2016.08); *G02B 6/0045* (2013.01); *G02B 6/0073* (2013.01)

(56) References Cited

FOREIGN PATENT DOCUMENTS

| | | |
|---|---|---|
| JP | 07-029709 U | 6/1995 |
| JP | 2003-016831 A | 1/2003 |
| JP | 2012-186118 A | 9/2012 |
| JP | 2013-152922 A | 8/2013 |
| JP | 2014-207184 A | 10/2014 |

* cited by examiner (A)

(B)

(C)

(A)

(B)

(C)

(A)

(B)

(C)

(D)

(E)

(A)

(B)

(C)

(A)

(B)

(C)

(A)

(B)

(C)

(D)

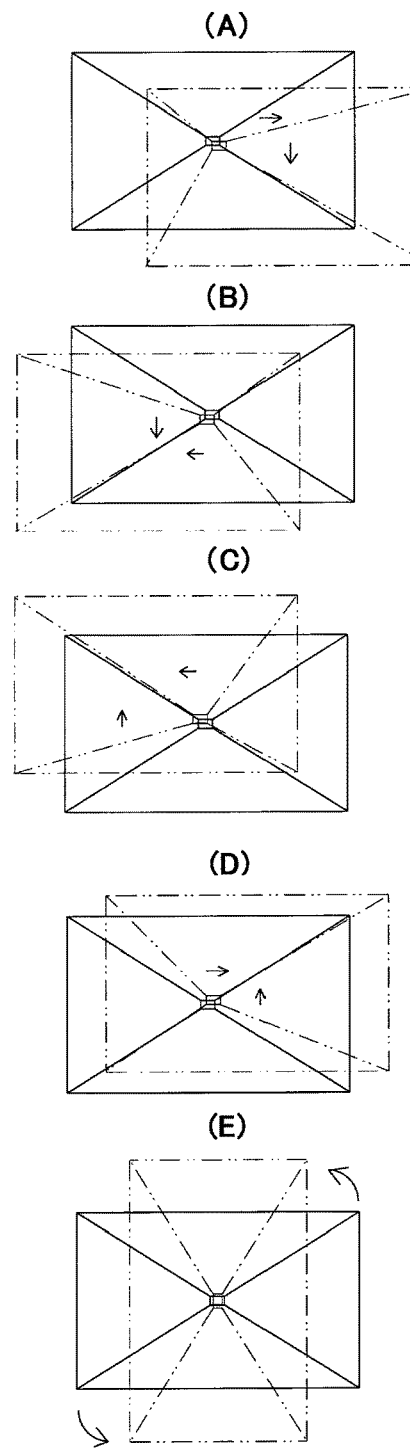

ILLUMINATION APPARATUS

TECHNICAL FIELD

The present invention relates to an illumination apparatus.

BACKGROUND ART

A technique for attaching a communication function module to a ceiling light, the communication function module being capable of using various types of functions while being attached to a ceiling or a wall surface, is disclosed in the following Patent Document 1.

Further, an illumination apparatus with an image projection device enabling spatial presentation in combination of illumination light and a video is disclosed in the following Patent Document 2.

RELATED ART DOCUMENTS

Patent Documents

Patent Document 1: Japanese Patent Application Laid-open Publication No. 2003-16831

Patent Document 2: Japanese Patent Application Laid-open Publication No. 2012-186118

SUMMARY OF THE INVENTION

Problems to be Solved by the Invention

However, the above-described related-art techniques disclose only a block diagram and a simple outer appearance as a projector, and do not disclose a projector which has been made in consideration of a function of freely moving and adjusting a projection position of a video from the projector in an illumination apparatus.

Generally, an illumination apparatus having a video projection function is attached to a ceiling surface for use. In the case, the illumination apparatus is set and adjusted so that a video projected from a projector is projected onto a desired position, e.g., a position on a surface of a table or others arranged in a room. However, after that, it is desired in some cases to change the position onto which the video from the projector is projected because of change in an arrangement of furniture or others in the room or others. However, in that case, it is required again to set and adjust the attachment position (also referred to as setting position) of the entire illumination apparatus having the video projection function onto a ceiling surface or a wall. This manner also including a work for the requirement is inconvenience for a user. That is, in the above-described conventional technique, consideration of a more favorable moving and adjusting function for the projected video in the illumination apparatus having the video projection function has not yet been sufficient.

Therefore, the present invention has been achieved in view of problems in the above-described related art technique, and an object of the invention is to provide an illumination apparatus having a video projection function which can more favorably move and adjust a position onto which a video is projected even after setting of the apparatus.

Means for Solving the Problems

In order to achieve the above-described object, an illumination apparatus which is held by a holding tool for fixing to a ceiling surface or a wall and which emits illumination light according to the present invention is provided, the illumination apparatus including: a light source for generating the illumination light, which is arranged inside a housing; a diffusion plate which is attached to a part of the housing and which diffuses the illumination light from the light source; a projector which is arranged inside a space where the housing and a part of the diffusion plate are arranged and which projects a video onto a projection surface; and movement means for enabling the whole or apart of the projector to move in a direction parallel to the projection surface.

Effects of the Invention

According to the present invention described above, an illumination apparatus having a video projection function which can more favorably move and adjust a position onto which a video is projected even after setting of the apparatus is provided.

BRIEF DESCRIPTIONS OF THE DRAWINGS

Figure 18:
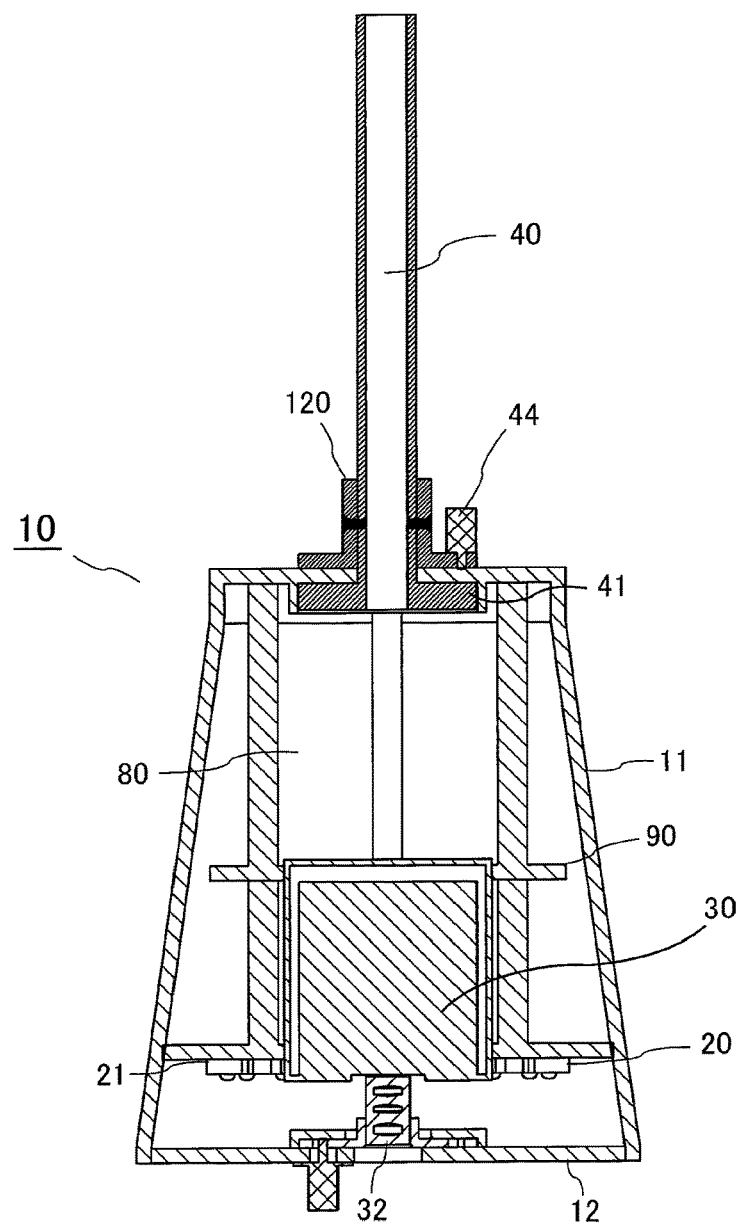
Figure 18:
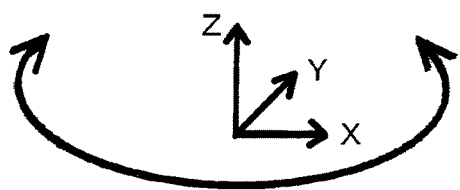

FIG. 18 is a cross-sectional view for explaining details of a mechanism of moving a projection lens in an illumination apparatus according to a fifth embodiment of the present invention; and FIG. 19 is a diagram illustrating movement and rotation of a projected video caused by movement of a projector main body according to the fifth embodiment in X-axis and Y-axis directions and rotation of the same around a Z axis.

BEST MODE FOR CARRYING OUT THE INVENTION

Embodiments of the present invention will be described in detail below with reference to the accompanying drawings.

Figure 1:
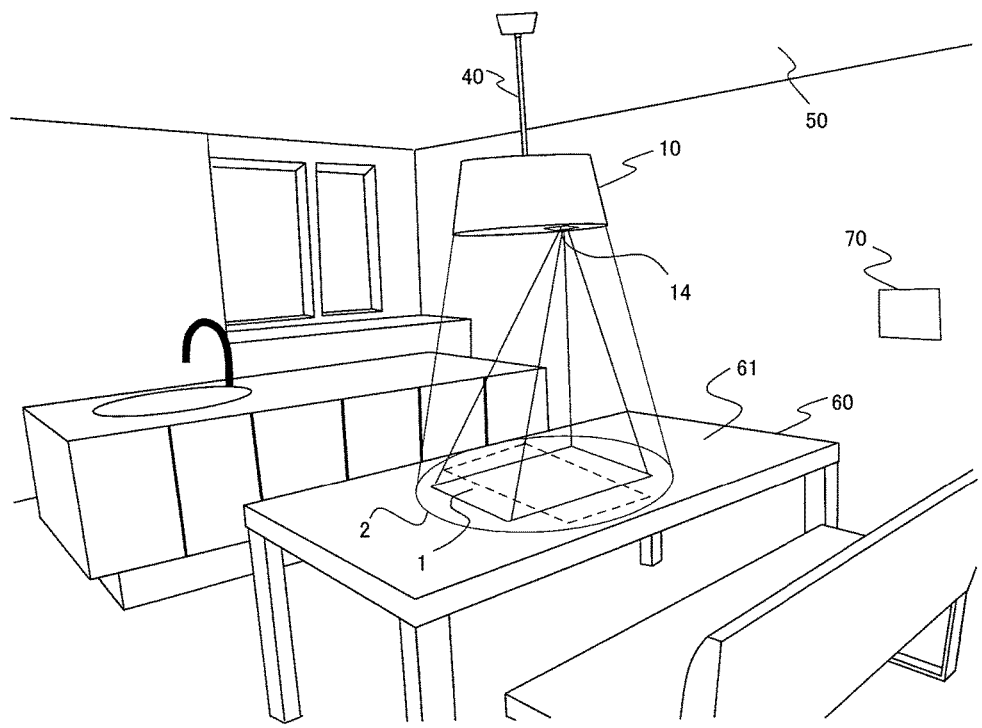
FIG. 1 is a perspective view illustrating a configuration of an outer appearance of an illumination apparatus having a video projection function according to an embodiment of the present invention, together with usage environment of the illumination apparatus.

First, FIG. 1 illustrates a configuration of an outer appearance of an illumination apparatus with a video projection function according to an embodiment of the present invention. Particularly, FIG. 1 illustrates an illumination apparatus with a video projection function obtained by mounting the video projection function on an illumination apparatus attached in a suspended form from a ceiling surface, which is a so-called pendant-type illumination apparatus. However, the present invention is not limited to only this. In addition, the present invention is also applicable to an illumination apparatus attached to a ceiling surface, which is a so-called ceiling-type illumination apparatus as described later.

As can also be seen from FIG. 1, an illumination apparatus with a video projection function 10 is used while being attached to, for example, a wall surface or a ceiling surface 50 constituting a space such as a kitchen, a dining room, a living room, an office, or others. More specifically, as also illustrated in FIG. 1, the illumination apparatus with the video projection function 10 is set above a table or a desk 60 set in a room so as to have a predetermined height or so as to be integrally with the ceiling surface. This illumination apparatus with the video projection function 10 is an illumination apparatus having both an illumination function for irradiating an upper surface of the table or the desk with illumination light 2 and a video projection function for projecting and displaying various types of videos 1 on the upper surface (also referred to as a display surface or a projection surface) 61 of the table or the desk 60. Note that a holding tool 40 in FIG. 1 represents, for example, a cylindrical pipe made of a metal such as aluminum, which is a holding tool for holding a pendant-type illumination apparatus with a video projection function 10 while being suspended at a desired position from the ceiling surface 50.

In FIG. 1, note that the holding tool 40 which is the pipe is attached to the ceiling surface 50. However, the holding tool may be attached to a wall or others through a bending process, a joint, or others.

The table or the desk 60 or others having a horizontal plane onto which a video is desired to be projected by using the video projection function has a high possibility to be an object illuminated by the illumination function in usage of the illumination apparatus while not using the video projection function. Accordingly, it is desirable to overlap at least partially a region onto which the video is projected by the video projection function and an illumination-light illumination coverage of the illumination function.

Note that the illumination apparatus with the video projection function is desirably configured so that the illumination light irradiated by the illumination function and the video projected by the video projection function can be turned on/off by mounting of a control unit. In the present example, note that a user performs such an operation via an operation panel 70 attached to the wall surface.

Here, the illumination apparatus with the video projection function 10 is fixed to the ceiling surface or others (which may be a wall) via the holding tool 40 which is the pipe or others as described above. However, the setting position of the table or the desk 60 may be changed by a change in layout of the furniture in the room or others. Thus, it is assumed that there is a user's desire to similarly change a projection position of the video 1 serving as a projected video of the illumination apparatus with the video projection function 10 when the setting position of the table or the desk 60 has changed. If an aspect ratio of the projected video is not 1:1 so that the projected video is rectangular, the video has a lengthwise direction and a widthwise direction. There may be a user's desire to change a direction of the rectangular video depending on a viewing content or a viewing position, as indicated by, for example, a broken line in FIG. 1. However, a method of changing a fixing position and a fixing direction of the illumination apparatus with the video projection function 10 to the ceiling surface or the wall requires construction, and therefore, is not easily made.

Therefore, on the illumination apparatus the illumination apparatus with the video projection function 10 itself, it is desirable to mount a function capable of changing and adjusting at least one of a position and a direction of the projected video. However, as different from a normal projection-type video apparatus having no illumination function, it is desirable to configure the illumination apparatus with the video projection function 10 so that a favorable outer appearance as an illumination apparatus can be maintained. The embodiment of the present invention will explain a specific example of the illumination apparatus with the video projection function 10 on which the function capable of changing and adjusting the position and the direction of the projected video in consideration of circumstances described above.

Figure 2:
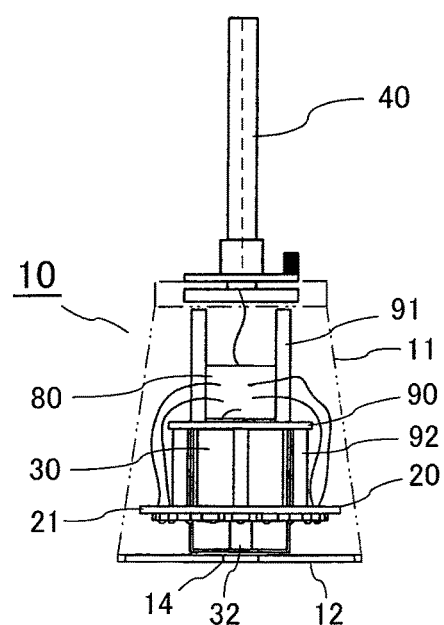
FIG. 2 is a diagram explaining an outline of an internal configuration of the above-described illumination apparatus having the video projection function.
Figure 2:
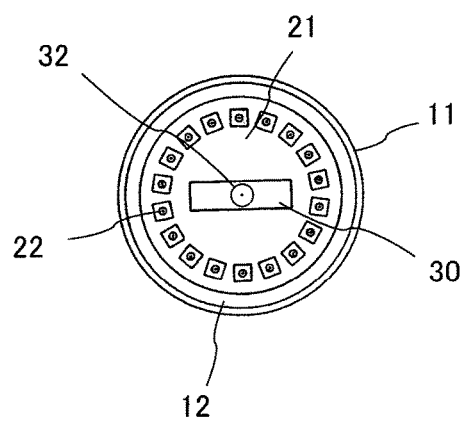
Figure 2:
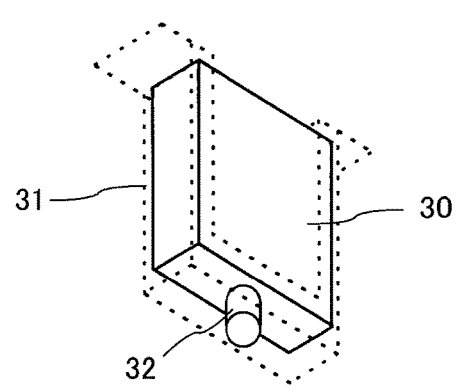

FIG. 2 illustrates an outline of an internal configuration of the illumination apparatus with the video projection function 10 illustrated in FIG. 1 described above. Inside of a main body (also referred to as a housing or a shade) 11 whose outer shape is, for example, substantially cylindrical or conical formed by metallic molding of a synthetic resin as illustrated in (A) of FIG. 2 includes: an illumination light source 20 configured by arranging a plurality of semiconductor light emitting elements (LEDs) 22 along its circumference so that substantially uniform illumination light is obtained on a surface of, for example, a disk-shaped substrate 21 made of a metal or others superior in thermal conductivity as illustrated in (B) of FIG. 2; and a small-sized projector 30 whose outer shape is a box shape for projecting and displaying various types of videos as illustrated in (C) of FIG. 2. Note that the diffusion plate 12 in the drawing represents a so-called diffusion plate provided to cover a lower opening of the main body 11 for diffusing the illumination light from the illumination light source 20 and for uniformly irradiating the diffused illumination light downward. An opening 14 is an opening formed at a part of the diffusion plate 12, and the video from the small-sized projector 30 is projected via the opening 14. Note that the explanation described above has been made while the outer shape of the main body (shade) 11 is substantially cylindrical or conical. However, the present invention is not limited to this, and other shapes such as a box shape may be applicable.

A power supply unit 80 illustrated in FIG. 2 described above represents a power supply unit converting a commercial alternating-current (AC) power, which is input via a plug for a lighting device not illustrated, into a desired alternate-current voltage or direct-current voltage. The power supply unit 80 is arranged on an upper surface of a disk-shaped holding plate 90 arranged on an upper portion of the small-sized projector 30, and supplies required power to the above-described illumination light source 20 and small-sized projector 30 via a wiring indicated by a curve line in the drawing. The small-sized projector 30 is embedded into the main body (shade) 11 in an upright state so that video light of the projector is projected downward as indicated by a broken line in (C) of FIG. 2, and is attached by using a casing member 31 whose outer shape is such a substantially "U" shape as covering outer periphery of the projector (specifically, the small-sized projector 30 is fixed by inserting the casing member 31 into a rectangular opening formed in the disk-shaped holding plate 90). Support pillars 91 and support pillars 92 in the drawing is are support pillars which extend from the holding plate 90 in an up-and-down direction so as to be connected to an upper surface of the main body (shade) 11 and the disk-shaped substrate 21, respectively. That is, by the above-described configuration, each unit is arranged at a desired position inside the main body (shade) 11.

Figure 3:
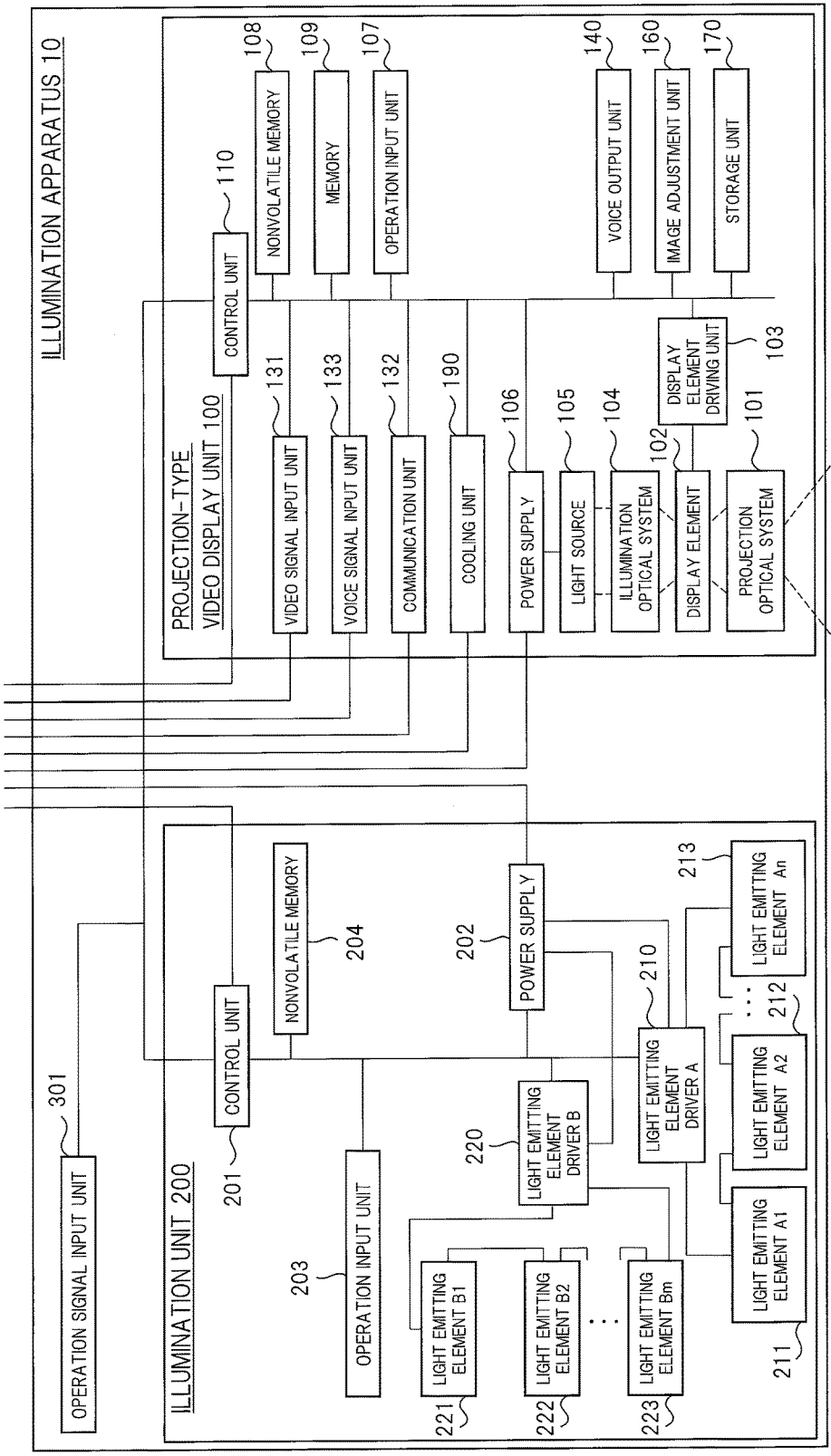
FIG. 3 is a block diagram illustrating a detailed circuit configuration inside the above-described illumination apparatus.

FIG. 3 is a block diagram illustrating an example of a specific circuit configuration of the above-described illumination apparatus with the video projection function 10. The illumination apparatus with the video projection function 10 includes a projection-type video display unit 100 (corresponding to the small-sized projector 30 illustrated in FIG. 2) having a video projection function and an illumination unit 200 having an illumination light irradiation function. An operation signal input unit 301 is an operation button or a light receiving unit of a remote controller, and an operation signal from a user is input thereto.

Next, a configuration of the projection-type video display unit 100 will be described. A projection optical system 101 is an optical system for projecting a video onto the display surface 61, and includes at least one of a lens and a mirror. A display element 102 is an element for modulating transmitted light or reflected light to generate a video, and, for example, a transmission-type liquid crystal panel, a reflection-type liquid crystal panel, a DMD (Digital Micromirror Device: registered trademark) panel, or others, is used as the display element 102. A display element driving unit 103 feeds a driving signal to the display element 102 in response to a video signal. A light source 105 generates light for video projection, and a high-pressure mercury lamp, a xenon lamp, an LED light source, a laser light source, or others is used as the light source 105. A power supply 106 converts an AC current which is input from the outside into a DC current, and supplies power to the light source 105. Further, the power supply 106 supplies a DC current required for each of other units. An illumination optical system 104 collects the light generated by the light source 105, more uniformizes the light, and irradiates the display element 102 with the light. A cooling unit 190 cools each unit such as the light source 105, the power supply 106, or the display element 102, whose temperature becomes high, by an air cooling system or a liquid cooling system as needed. An operation input unit 107 is an operation button or a light receiving unit of a remote controller, and an operation signal from the user is input thereto. The operation input unit 107 may receive an infrared-ray signal or a radio-wave signal from the operation panel 70 illustrated in FIG. 1. If a signal from the operation signal input unit 301 in the illumination apparatus with the video projection function 10 is input to the projection-type video display unit 100, a configuration without the operation input unit 107 may be applied.

To a video signal input unit 131, an external video output device is connected, and video data is input. To a voice signal input unit 133, an external voice output device is connected, and voice data is input. A voice output unit 140 can output the voice based on the voice data input to the voice signal input unit 133. The voice output unit 140 may output a built-in operation sound or an error warning sound. A communication unit 132 is connected to, for example, an external information processing apparatus, and various types of control signals are input/output thereto/therefrom. The communication unit 132 may have wired communication or wireless communication with the operation panel 70 illustrated in FIG. 1.

A nonvolatile memory 108 stores various types of data used in a projector function. A memory 109 stores video data to be projected and data for controlling the apparatus. A control unit 110 controls an operation of each of the connected units.

An image adjustment unit 160 performs the image processing for the video data which has been input to the video signal input unit 131. The image processing includes, for example, a scaling processing for magnifying, reducing, and deforming an image or others, a bright adjustment processing for changing luminance, a contrast adjustment processing for changing a contrast curve of an image, a retinex processing for decomposing an image into optical components and changing a weighting for each of the components, and others.

A storage unit 170 records a video, an image, a voice, various types of data, and others. The video, the image, the voice, the various types of data, and others may be previously recorded therein at the time of, for example, product shipment, and a video, an image, a voice, various types of data, and others acquired from external equipment, an external server, or others via the communication unit 132 may be recorded therein. The video, the image, the various types of data, and others recorded in the storage unit 170 may be output as a projected video via the display element 102 and the projection optical system 101. The voice recorded in the storage unit 170 may be output as a voice from the voice output unit 140.

As described above, various functions can be mounted on the projection-type video display unit 100. However, the projection-type video display unit 100 does not always need to have all the above-described configurations. The projection-type video display unit 100 may have any configuration as long as it has a function of projecting a video.

Next, a configuration of the illumination unit 200 will be described.

A control unit 201 controls each of the connected units. An operation input unit 203 is an operation button or a light receiving unit of a remote controller, and an operation signal from the user is input to the operation input unit. The operation input unit 203 may receive an infrared-ray signal or a radio signal from the operation panel 70 illustrated in FIG. 1. If a signal from the operation signal input unit 301 in the illumination apparatus with the video projection function 10 is input to the illumination unit 200, a configuration without the operation input unit 203 may be applicable. A nonvolatile memory 204 stores various types of data used in the illumination unit 200.

A power supply 202 converts an AC current input from the outside into a DC current, and supplies power to light emitting element drivers (210, 220, etc.). Further, the power supply 202 supplies a DC current required for each of other units. The light emitting element drivers (210, 220, etc.) cause light emitting elements (211, 212, 213, 221, 222, 223, etc.) to emit the light based on the control of the control unit 201 while using the power supplied from the power supply 202. The light emitting element becomes a light source of the illumination light emitted by the illumination unit 200. In the example illustrated in FIG. 3, for example, the light emitting element driver A210 collectively drives "n" light emitting elements A1, A2, . . . An (211, 212, 213, etc.) connected in series. The light emitting element driver A210 changes a luminance, a color, or others of each of the light emitting elements based on the control of the control unit 201. Similarly, the light emitting element driver B220 collectively drives "m" light emitting elements B1, B2, . . . Bm (221, 222, 223, etc.) connected in series. The light emitting element driver B220 changes a luminance, a color, or others of each of the light emitting elements based on the control of the control unit 201. By such a configuration, control to change the luminance or the color of each of the plurality of light emitting elements can be performed for each of the light emitting element drivers. In the example illustrated in FIG. 3, an example of two sets of the light emitting element driver and the plurality of light emitting elements has been exemplified. However, the number of sets may be one or three or more. The number of sets may be increased or decreased, as needed.

By the configuration described above, the illumination unit 200 can emit the illumination light having a luminance and a color at least either one of which is variable.

Then, in an illumination apparatus having a video projection function, means and a mechanism capable of favorably moving and adjusting a position of a video projected from a projector, which are features of the present invention, will be specifically described in detail below as a first embodiment to a fifth embodiment.

First Embodiment

Figure 4:
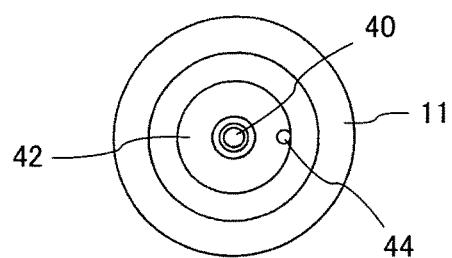
FIG. 4 is a top view, a side view, and a bottom view explaining an internal configuration of an illumination apparatus according to a first embodiment of the present invention.
Figure 4:
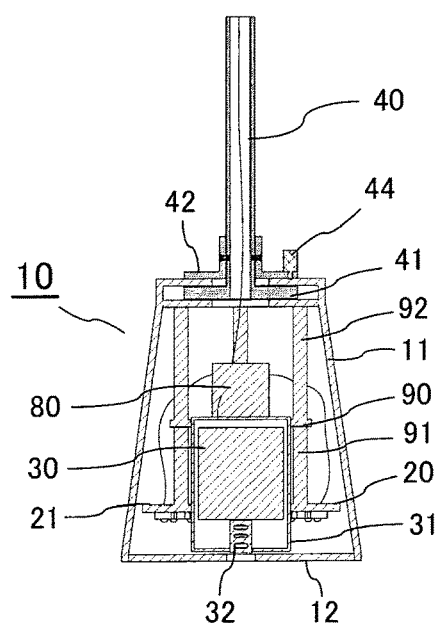
Figure 4:
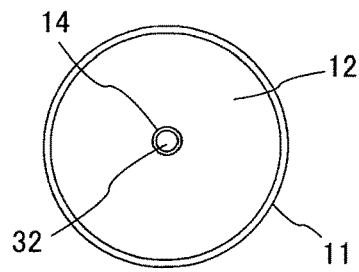

Regarding the whole of the above-described illumination apparatus with the video projection function 10, i.e., relates to the main body 11 itself in which the illumination light source 20, the small-sized projector 30, and the power supply unit 80 are arranged, in the first embodiment, a relative position between the apparatus and an attachment position of the apparatus, i.e., a position (more specifically, a central axis) of the holding tool 40 serving as a metallic pipe fixedly attached to the ceiling surface 50 is variable. In FIG. 4, note that the illumination apparatus with the video projection function 10 according to the first embodiment is illustrated so as to include its internal configuration, as a top view in (A), a side view (a cross-sectional view) in (B), and a bottom view in (C). However, many parts of these contents are similar to those illustrated in FIG. 2 described above. Accordingly, detailed description for the similar parts to those illustrated in FIG. 2 is omitted here, and a rotation mechanism which is a feature of the illumination apparatus 10 will be described below with reference to FIGS. 4, 5, and 6. Hereinafter, each of side views used for the description is a cross-sectional view in order to make the description easy.

Figure 5:
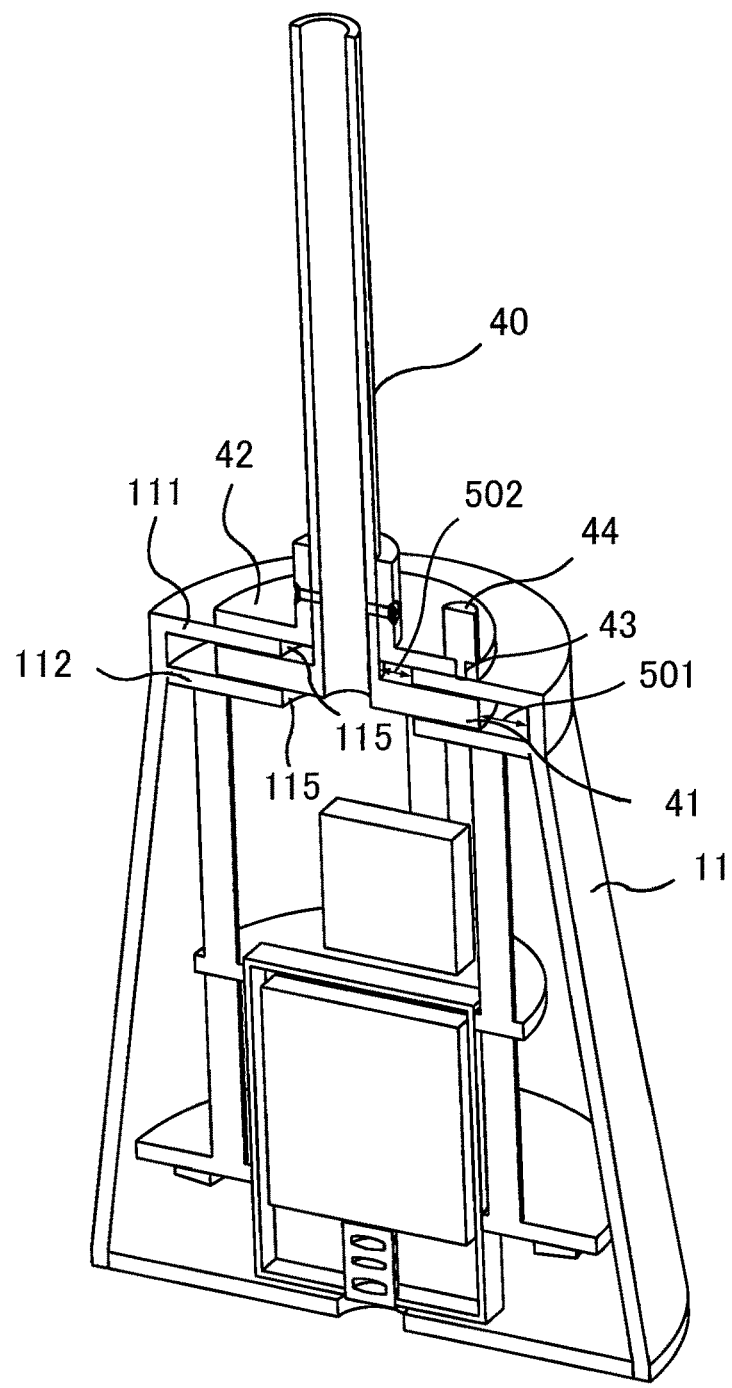
FIG. 5 is a perspective view illustrating an enlarged part of a rotation mechanism in the illumination apparatus according to the first embodiment, together with its cross section, for explaining details of the rotation mechanism.

As illustrated in FIGS. 4 and 5, a disk-shaped flange unit 41 is formed at a lower end of the pipe serving as the holding tool 40 of the apparatus to the ceiling surface while double disk units 111 and 112 are formed in an upper surface portion of the main body (shade) 11, and besides, the flange unit 41 is further slidably inserted into a columnar gap formed between the disk unit 111 and the disk unit 112. An opening 115 having a larger diameter than the diameter of the holding tool 40 is formed at a central portion of each of the double disk units 111 and 112 in the upper surface portion of the main body (shade) 11, and gaps 501 and 502 for adjusting a relative position between the holding tool 40 and the main body (shade) 11 are provided. Thus, by sliding between an upper surface of the disk-shaped flange unit 41 in the holding tool 40 and a lower surface of the disk unit 111, the main body (shade) 11 is rotatable around a "Z" axis that is an axis perpendicular to a video projection surface, and a position of the main body is also movable in a direction of a horizontal plane (X-axis and Y-axis directions) that is a plane parallel to the video projection surface. A movement range of the main body (shade) 11 can be adjusted by setting the gaps 501 and 502 to desired values at the time of design. Further, a fixing member 42 having a flange portion is arranged above the double disk units 111 and 112 so as to sandwich the disk unit 111 between the fixing member and the flange unit 41 at the lower end of the holding tool 40 and to cover the disk unit 111. Further, a screw hole 43 is formed in a part of the flange portion of the fixing member 42, and a fastening screw (locking screw) 44 is threaded into the hole as also illustrated in FIGS. 4 and 5.

In (B) of FIG. 4, a configuration in the illumination apparatus with the video projection function 10 is indicated by wide-interval oblique lines in cross section, the configuration having a position that is variable relative to the holding tool 40 serving as a fixing member whose position is invariable relative to a ceiling or a wall.

Figure 6:
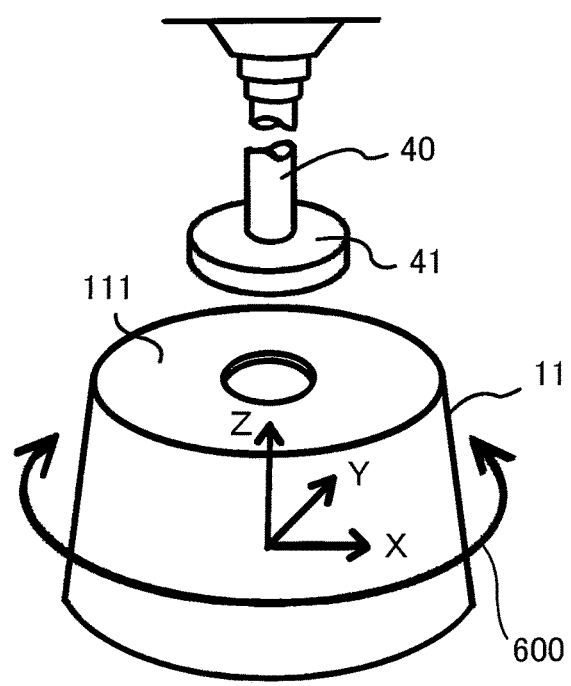
FIG. 6 is a diagram explaining an operation of the rotation mechanism in the illumination apparatus according to the first embodiment.

According to the above-described configuration portion, as also illustrated in FIG. 6, the whole of the above-described illumination apparatus with the video projection function 10, i.e., the main body (shade) 11 itself in which the illumination light source 20, the small-sized projector 30, and the power supply unit 80 are arranged, is movable in the horizontal plane direction (X-axis and Y-axis directions), and further becomes rotatable around a central axis (Z-axis) of the pipe serving as the holding tool 40 as indicated by an arrow 600 illustrated in FIG. 6. That is, a video projected from the small-sized projector 30 can be rotated relative to the upper surface 61 of the table or the desk 60 by the rotation of the main body (shade) 11 (see a broken line on the table or the desk 60 in FIG. 1, described above), and besides, a position of the projected video can be moved and adjusted in the X-axis and Y-axis directions (in up-and-down and right-and-left directions when the video is viewed from a front side) by the movement in the X-axis and Y-axis directions of the main body (shade) 11. That is, the projected video can be rotated in one-axis direction and moved in two-axes directions. In the case, a position of the main body (shade) 11 relative to the central axis (Z-axis) of the holding tool 40 can be set and adjusted to a desired position by loosening the fastening screw (locking screw) 44 to adjust a rotation angle and a movement position of the main body (shade) 11, and then, retightening the fastening screw 44.

Thus, the movement and rotation functions of the projected video can be achieved at relatively low cost without the need to include a mechanism such as a gear or a rack by application of the position locking mechanism (the fastening screw 44 in the above-described example) and the mechanism for the sliding between the horizontal plane (the flange unit 41 in the above-described example) of the fixing member having the invariable position relative to the ceiling or the wall and the horizontal plane (the disk unit 11 in the above-described example) of the member including the small-sized projector 30, the member having the variable position relative to the fixing member.

Figure 7:
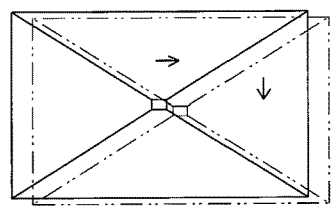
FIG. 7 is a diagram illustrating movement and rotation of a projected video caused by movement of a projector main body according to the first embodiment in X-axis and Y-axis directions and rotation of the same around a Z axis.
Figure 7:
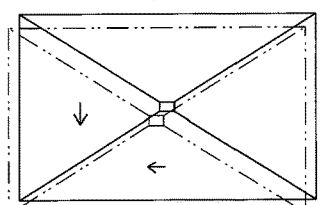
Figure 7:
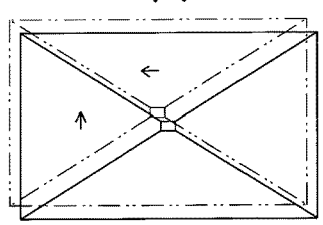
Figure 7:
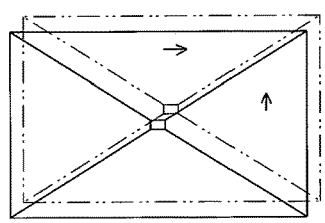
Figure 7:
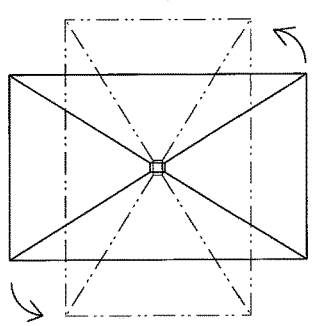

An example of the movement of the projected video caused by the movement of the main body (shade) 11 in the small-sized projector in the X-axis and Y-axis directions described above is illustrated by using a solid line and a two-dot and dash line in (A) to (D) of FIG. 7. At this time, an amount of the movement of the projected video becomes the same as a spatial amount of the movement of the main body (shade) 11. For example, if the gaps 501 and 502 are set so that the main body (shade) 11 is movable by a maximum of ±10 mm in the X-axis and Y-axis directions, the video is also movable by a maximum of ±10 mm in the X-axis and Y-axis directions. The movement and the rotation of the projected video caused by the rotation of the main body (shade) 11 of the small-sized projector around the Z-axis are illustrated by using a solid line and a two-dot and dash line in (E) of FIG. 7.

In the above-described example, note that the explanation has been made in an assumption that a projection lens 32 (see (C) of FIG. 2) in the small-sized projector 30 is arranged at a central portion of a lower surface of the illumination apparatus with the video projection function 10. However, if a position of the projection lens 32 is not at the center of the lower surface of the illumination apparatus with the video projection function 10, it would be understood for those skilled in the art to form a position of the opening 14, that is formed on a part of the diffusion plate 12, at a position other than a central portion to match the position of the projection lens 32.

In the illumination apparatus with the video projection function according to the first embodiment of the present invention described above, the rotation and the movement of the projected video can be favorably achieved. Since the rotation and the movement of the video can be achieved without changing the relative position between the diffusion plate 12 and the projection lens 32, the size of the opening 14 of the diffusion plate 12 can be minimized, so that dust proofing performance is easier to be enhanced, and an aesthetic outer appearance as an illumination apparatus can be further enhanced.

Second Embodiment

Figure 8:
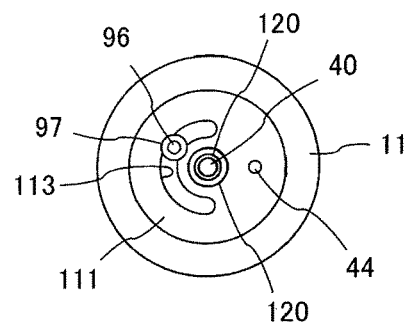
FIG. 8 is a top view, a side view, and a bottom view explaining an internal configuration of an illumination apparatus according to a second embodiment of the present invention.
Figure 8:
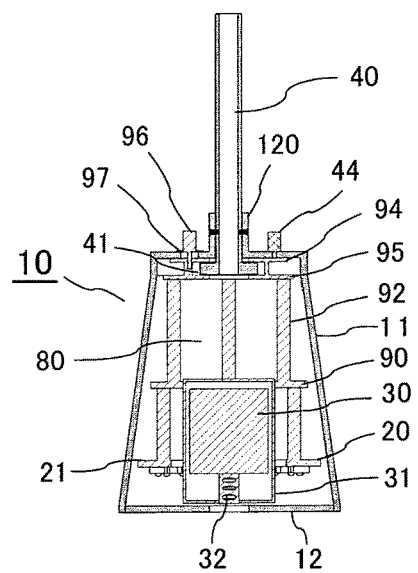
Figure 8:
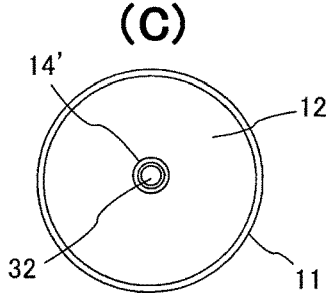

In a second embodiment, regarding a portion in the illumination apparatus with the video projection function 10, that is, the portion being an illumination light source 20, a small-sized projector 30, and a power supply unit 80 inside a main body (shade) 11, a position of the portion is variable relative to the holding tool 40 serving as a fixing member whose position is invariable relative to a ceiling or a wall. On the other hand, the main body (shade) 11 has a structure whose relative position to the holding tool 40 is fixed. In FIG. 8, the illumination apparatus with the video projection function 10 according to the second embodiment is illustrated so as to include its internal configuration, as a top view in (A), a side view in (B), and a bottom view in (C). Note that these contents basically have many similar parts to those illustrated in FIG. 2 described above. Accordingly, detailed description for the similar parts to those illustrated in FIG. 2 is omitted here, and a rotation mechanism which is a feature of the illumination apparatus 10 will be described below with reference to FIGS. 8 and 9.

Figure 9:
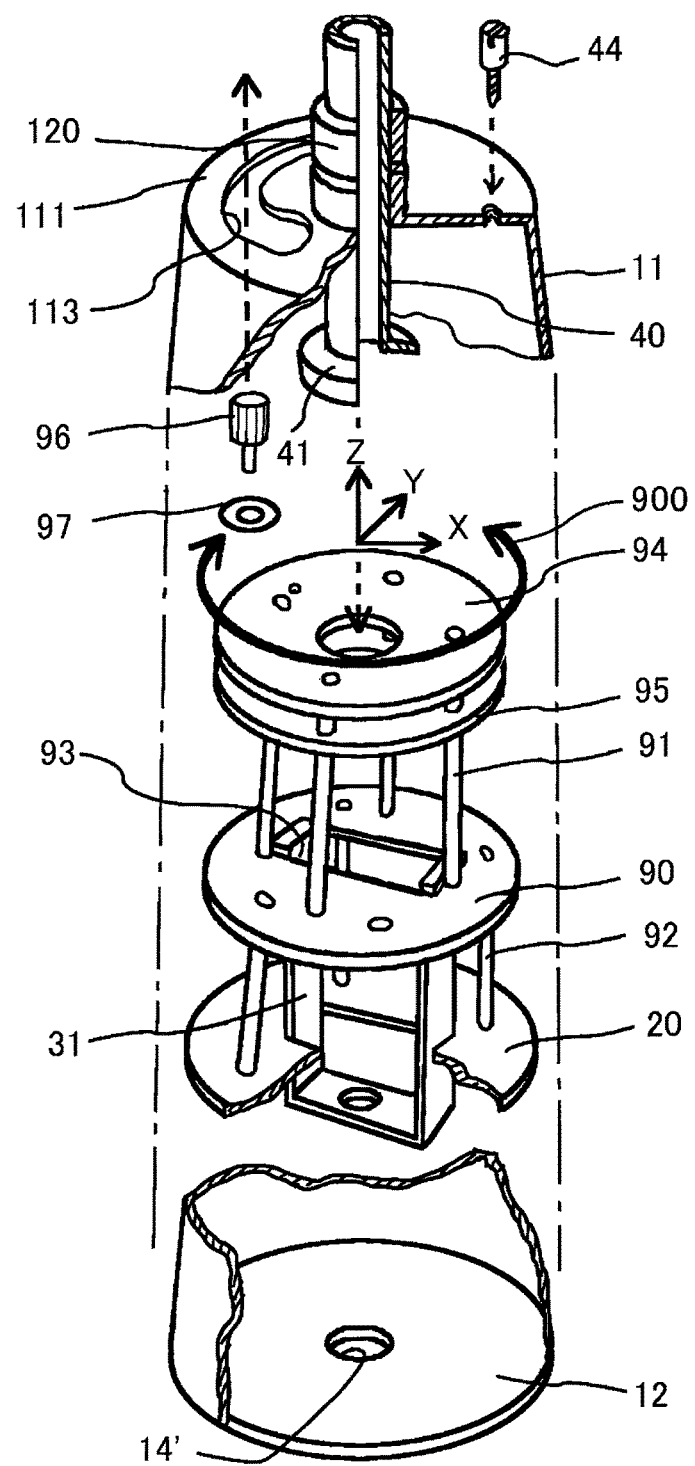
FIG. 9 is a developed perspective view for explaining details of a rotation mechanism in the illumination apparatus according to the second embodiment.

As illustrated in FIG. 9, a pipe serving as a holding tool 40 fixed to a ceiling or a wall is fixed to a disk unit 111 serving as an upper surface of a main body (shade) 11 by a fixing member 120. Meanwhile, below this structure, via a support pillar 91 extending upward from a disk-shaped holding plate 90, double disk units 94 and 95 are attached above the support pillar 91. In a central portion of each of the disk units 94 and 95, an opening having a diameter larger than the diameter of the pipe serving as the holding tool 40 but smaller than a diameter of a flange unit 41 at a lower end of the pipe is formed. A difference between the diameters gives a sliding range, described below. Further, the disk-shaped flange unit 41 of the holding tool 40 is slidably inserted into a gap formed between the disk units 94 and 95 (see a dotted-line arrow in FIG. 9). That is, the double disk units 94 and 95 are movable in a horizontal plane direction (X-axis and Y-axis directions) relative to the holding tool 40 fixed to the ceiling or the wall, and is rotatable around a Z-axis. That is, a projected video can be rotated in one-axis direction and moved in two-axes directions. Note that a protrusion (a so-called knob) 96 which a user can hold with his/her fingers is attached across a cover ring 97 to the upper disk unit 94 of the double disk units, and the protrusion 96 is configured to protrude outward after passing through a half-moon-shaped opening 113 formed in the disk unit 111 serving as the upper surface of the main body (shade) 11 when the illumination apparatus with the video projection function 10 is assembled.

As similar to the above-described embodiment, a casing member 31 in which the small-sized projector 30 is to be embedded in an upright state is inserted into a rectangular opening 93 formed in a substantially central portion of the disk-shaped holding plate 90, and a disk-shaped illumination light source 20 is further attached to a lower end of a support pillar 92 extending downward from the disk-shaped holding plate 90. In order to easily understand a configuration of each of members, note that illustration of the small-sized projector 30 and the power supply unit 80 embedded inside the main body (shade) 11 is omitted.

In (B) of FIG. 8, a configuration in the illumination apparatus with the video projection function 10 is indicated by wide-interval oblique lines in cross section, the configuration having a position that is variable relative to the holding tool 40 serving as a fixing member whose position is invariable relative to a ceiling or a wall.

According to the above-described configuration portion, as illustrated in FIG. 9, a portion of the above-described illumination apparatus with the video projection function 10, i.e., the configuration including the illumination light source 20, the small-sized projector 30, and the power supply unit 80, is movable in the horizontal plane direction (X-axis and Y-axis directions) inside the main body (shade) 11 fixed to the pipe serving as the holding tool 40, and further becomes rotatable around a central axis (Z-axis) of the holding tool 40 as indicated by an arrow 900. That is, a video projected from the small-sized projector 30 can be rotated relative to the upper surface 61 of the table or the desk 60 by the rotation of the double disk units 94 and 95, and besides, a position of the projected video can be moved and adjusted in the X-axis and Y-axis directions (in up-and-down and right-and-left directions when the video is viewed from a front side) by the movement in the X-axis and Y-axis directions of the double disk units.

Thus, the movement and rotation functions of the projected video can be achieved at relatively low cost without the need to include a mechanism such as a gear or a rack by application of the position locking mechanism (the fastening screw 44 in the above-described example) and the mechanism for the sliding between the horizontal plane (the flange unit 41 in the above-described example) of the fixing member having the invariable position relative to the ceiling or the wall and the horizontal plane (the disk unit 94 in the above-described example) of the member having the variable position relative to the fixing member of the small-sized projector 30.

In the second embodiment, note that the small-sized projector 30 becomes movable in the X-axis and Y-axis directions and rotatable around the Z-axis inside the main body (shade) 11. Accordingly, as also illustrated in (C) of FIG. 8 and FIG. 9, an opening 14b formed in a part of a diffusion plate 12 needs to have a larger diameter than a diameter of a projection lens 32 in consideration of the movement in the X-axis and Y-axis directions of the projection lens 32.

Note that the movement of the projected video caused by the movement of the small-sized projector 30 inside the main body (shade) 11 in the X-axis and Y-axis directions described above is indicated by using a solid line and a two-dot and dash line in (A) to (D) of FIG. 7 as similar to the first embodiment. At this time, an amount of the movement of the projected video becomes the same as a spatial amount of the movement of the small-sized projector 30. For example, if such a peripheral structure as limiting diameter of the holding tool 40, the diameter of the flange unit 41, and the movement ranges of the holding tool and the flange unit is set so that the small-sized projector 30 is movable by a maximum of ±10 mm in the X-axis and Y-axis directions, the video is also movable by a maximum of ±10 mm in the X-axis and Y-axis directions. The rotation of the projected video caused by the rotation of the small-sized projector 30 inside the main body (shade) 11 around the Z-axis is illustrated by using a solid line and a two-dot and dash line in (E) of FIG. 7.

Figure 10:
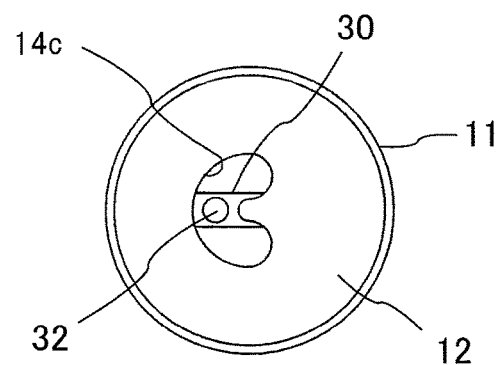
FIG. 10 is a bottom view illustrating a modified example of the illumination apparatus according to the second embodiment.

If a position of the projection lens 32 is not at a center of a rotation center of the small-sized projector 30, the opening 14b formed in a part of the diffusion plate 12 may be formed into a shape adapted to movement of the position of the projection lens 32, i.e., a substantially half-moon shape in the present embodiment as also illustrated as, for example, an opening 14c of the diffusion plate 12 illustrated in FIG. 10 as a modified example.

Note that the size of the opening 14b can be minimized by the arrangement of the position of the projection lens 32 at the center of the rotation center of the small-sized projector 30.

When the position of the projected video from the projector is moved and adjusted, the user can set and adjust the position by loosening the fastening screw (locking screw) 44 and holding the above-described protrusion 96 to adjust a rotation angle and a movement position of a member for holding the small-sized projector 30 inside the main body (shade) 11, and then, retightening the fastening screw 44.

In the illumination apparatus with the video projection function according to the second embodiment of the present invention described above, the rotation and the movement of the projected video can be favorably achieved. A position and a direction of the main body (shade) 11 relative to the ceiling or the wall are fixed, so that an effect of stability in the outer appearance as the illumination apparatus is obtained even when the position and the angle of the video are adjusted.

Then, hereinafter, the illumination apparatus with the video projection function 10 which moves the position of the projected video by varying the relative position between the display element and the projection optical system (e.g., the projection lens) will be described in detail as third to fifth embodiments with reference to the drawings.

Figure 11:
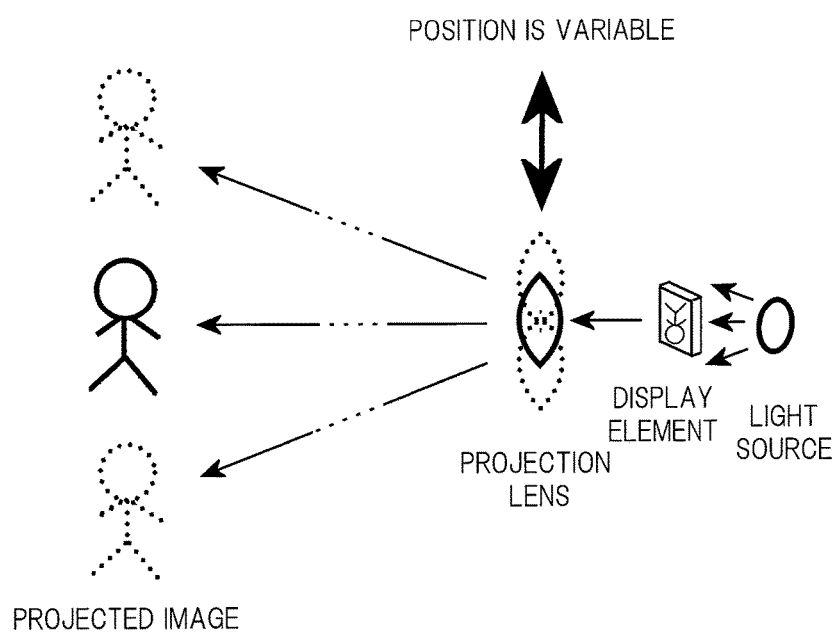
FIG. 11 is a diagram for explaining a function of varying a relative position between a display element and a projection optical system used in illumination apparatuses according to a third embodiment and a fourth embodiment of the present invention.

A principle of such a function of varying the relative position between the display element and the projection optical system (e.g., the projection lens) will be described with reference to FIG. 11. The video light emitted from the light source and modulated by the display element (e.g., a transmission-type liquid crystal panel or others) is magnified by the projection lens and is projected onto a projection surface. When the projection lens is moved in a direction parallel to a surface of the display element as indicated by a dotted line and an arrow in FIG. 11, a relative position between an optical axis of the projection optical system and the display element serving as an optical "object" can be varied. Consequently, a display position on a projection surface of the magnified projected video serving as an optical "image" moves as illustrated in FIG. 11. At this time, an amount of movement of the projected video becomes an amount obtained by multiplying an amount of movement of the relative position between the display element and the projection optical system by a magnification percentage (that is a size of the "image" relative to a size of the "object") made by the projection optical system. Accordingly, the higher the magnification percentage is, the larger the amount of movement of the projected video is.

By usage of this function of varying the relative position between the display element and the projection optical system, the position on the projection surface of the video projected from the illumination apparatus with the video projection function 10 can be moved in a larger range than a position obtained when the position of the small-sized projector 30 is varied without changing the relative position between the display element and the projection optical system. Thus, the position of the projected video can be favorably set and adjusted.

Note that the effect is obtained when the relative position between the display element and the projection optical system is varied. Therefore, a position of the optical axis of the projection optical system may be varied while a spatial position of the display element is fixed. Conversely, the spatial position of the display element may be varied while the position of the optical axis of the projection optical system is fixed.

Third Embodiment

In a third embodiment, the position of the projected video can be moved in a larger range by usage of the function of varying the relative position between the display element and the projection optical system described above. In the third embodiment, the above-described illumination apparatus with the video projection function 10 is structured so that a position of a projection lens 32 serving as a projection optical system in a small-sized projector 30 relative to a ceiling or a wall is fixed and so that a portion including the display element in the small-sized projector 30 is movable and rotatable. Thus, a relative positional relation between the optical axis of the projection optical system and the display element can be changed.

Figure 12:
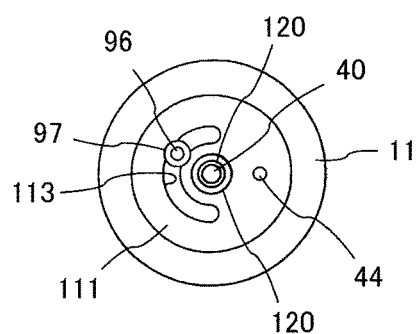
FIG. 12 is a top view, a side view, and a bottom view explaining an internal configuration of the illumination apparatus according to the third embodiment of the present invention.
Figure 12:
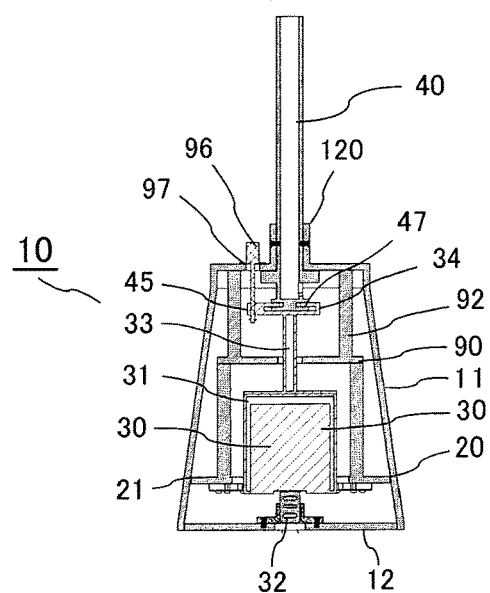
Figure 12:
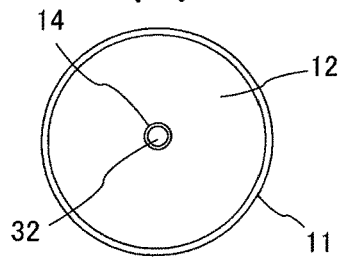

In FIG. 12, the illumination apparatus with the video projection function 10 according to the third embodiment is illustrated so as to include its internal configuration, as a top view in (A), a side view in (B), and a bottom view in (C). Note that these contents basically have many similar parts to those illustrated in FIG. 2 described above. Accordingly, detailed description for the similar parts to those illustrated in FIG. 2 is omitted here, and a rotation mechanism which is a feature of the illumination apparatus 10 will be described below with reference to FIGS. 12 and 13.

Figure 13:
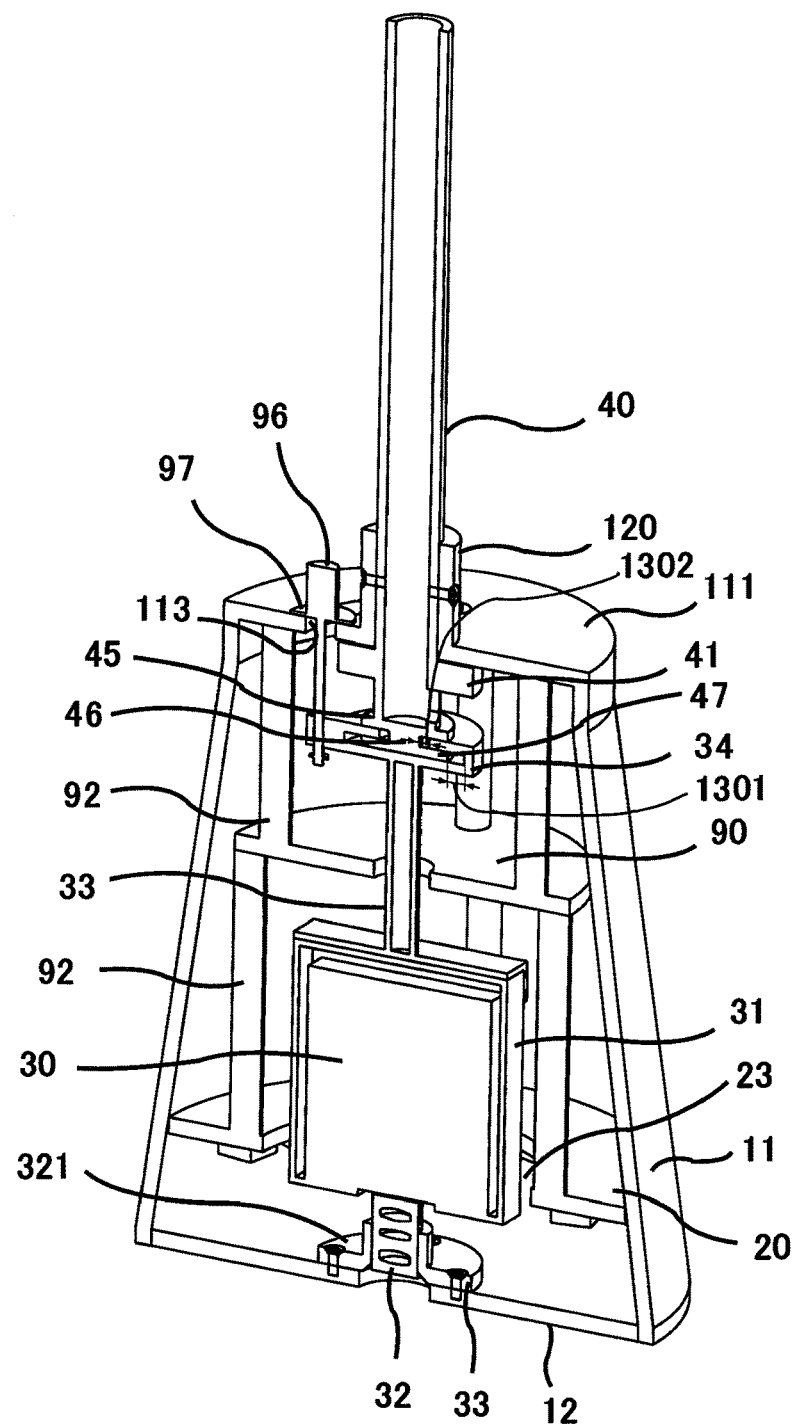
FIG. 13 is a perspective view for explaining details of a mechanism of moving a relative position between a projector and a projection lens in the illumination apparatus according to the third embodiment, together with its cross section.

As can be seen from FIG. 13, a pipe serving as a holding tool 40 to a ceiling surface is fixed to a disk unit 111 serving as an upper surface of a main body (shade) 11 by a flange unit 41 at a lower end of the pipe and a fixing member 120. Further, a smaller flange unit 45 is formed below the flange unit 41, and besides, a shaft unit 46 and a disk-shaped member 47 are integrally formed at a lower end of the flange unit 45.

Meanwhile, a cylindrical member 33 extends upward from an upper surface of a casing member 31 that is used for embedding the small-sized projector 30 therein in an upright state, and a disk-shaped member 34 whose outer periphery has partially a convex portion formed is integrally formed at a distal end of the member 33. A cylindrical space having a larger diameter than the diameter of the disk-shaped member 47 formed at a lower end of the holding tool 40 is formed inside this disk-shaped member 34, and besides, a circular opening having a diameter smaller than the diameter of the disk-shaped member 47 but larger than the diameter of the shaft unit 46 is formed on an upper surface of the space.

That is, the disk-shaped member 47 at the lower end of the holding tool 40 is movably housed in an internal space of the disk-shaped member (hereinafter also referred to as a suspended member) 34. The diameter of the circular opening on the upper surface of the disk-shaped member 34 serving as the suspended member is larger than the diameter of the shaft unit 46 but is smaller than the diameter of the disk-shaped member 47. Therefore, the disk-shaped member 34 serving as the suspended member stays at the lower end of the holding tool 40, and can move and rotate. A movement range of the disk-shaped member 34 can be adjusted by setting a gap 1301 between the disk-shaped member 47 and the disk-shaped member 34 and a gap 1302 between the shaft unit 46 and the circular opening on the upper surface of the disk-shaped member 34 to desired values at the time of design.

A half-moon-shaped opening 113 is formed in the disk unit 111 serving as the upper surface of the main body (shade) 11, and a protrusion 96 which the user can hold with his/her fingers is provided so as to interpose a covering 97 through the opening 113. Correspondingly, a protrusion 96 is attached to a convex portion serving as a part of the outer periphery of the upper one of the double disk units in the disk-shaped member 34 serving as the suspended member. Note that the protrusion 96 passes through the opening 113 and protrudes outward when the illumination apparatus with the video projection function 10 is assembled. Accordingly, the user can use the protrusion 96 when a portion including the display element in the small-sized projector 30 is moved in a horizontal plane direction (X-axis and Y-axis directions) and is rotated around a central axis (Z-axis). That is, the projected video can be rotated in one-axis direction and moved in two-axes directions.

Note that a position locking mechanism for the movement and rotation may be a locking mechanism by such screw tightening as shaping a joint between the protrusion 96 and the disk-shaped member (suspended member) 34 into a screw form. Alternatively, although not illustrated in FIG. 13, a fastening screw (locking screw) 44 for fixing the rotation and movement may be provided in the disk unit 111 serving as the upper surface of the main body (shade) 11 separately from the protrusion 96 as illustrated in (A) of FIG. 12.

In (B) of FIG. 12, a configuration in the illumination apparatus with the video projection function 10 is indicated by wide-interval oblique lines in cross section, the configuration having a position that is variable relative to the holding tool 40 serving as a fixing member whose position is invariable relative to a ceiling or a wall.

In the present third embodiment, as illustrated in FIG. 13, the illumination light source 20 formed by arranging a plurality of semiconductor light emitting elements (LEDs) on a substrate 21 is fixed to the main body (shade) 11 while a circular opening 23 is formed in a central portion of the illumination light source 20. This manner prevents a bottleneck when the portion including the display element in the small-sized projector 30 moves and rotates.

Meanwhile, a flange-shaped unit 321 is formed at a lower end of the projection lens 32 having a variable position relative to the portion including the display element in the small-sized projector 30, and the flange-shaped unit 321 is fixed onto a surface of a diffusion plate 12 attached to the bottom of the main body (shade) 11. In the present embodiment, note that the projection lens 32 is fixed to a position of an opening provided in a central portion of the diffusion plate 12 by using the flange-shaped unit 321.

According to the above-described configuration, the portion including the display element in the small-sized projector 30 is rotatable and movable relative to the above-described projection lens 32 fixed to the central portion of the diffusion plate 12. Thus, the above-described function of varying the relative position between the display element and the projection optical system can be achieved. In the case, as similar to the above description, the user releases the above-described position locking mechanism by loosening the locking or others and holding the protrusion 96 or others to adjust a rotation angle and a movement position of the small-sized projector 30 inside the main body (shade) 11. Then, by the locking caused by retightening the position locking mechanism or others, the position can be set and adjusted.

In the above-described example, note that the explanation has been made about an example in which the projection lens 32 is fixed to the diffusion plate 12. However, the projection lens 32 may be fixed to any member other than the diffusion plate 12 as long as the relative position of the member to the main body (shade) 11 is fixed.

In the above-described example, note that the explanation has been made about the example in which the projection lens 32 in the small-sized projector 30, the disk-shaped member 47, a rotation center of the portion including the display element in the small-sized projector 30, and the center of the holding tool 40 are arranged on a straight line in a vertical direction at a central position of the main body (shade) 11. However, the projection lens 32 in the small-sized projector 30 can also be arranged at a position not matching the center of the holding tool 40 or a position offset from the central position of the main body (shade) 11. In this case, the rotation center of the portion including the display element in the small-sized projector 30 may be arranged at a position offset to match the offset position of the projection lens 32 in the small-sized projector 30.

Figure 14:
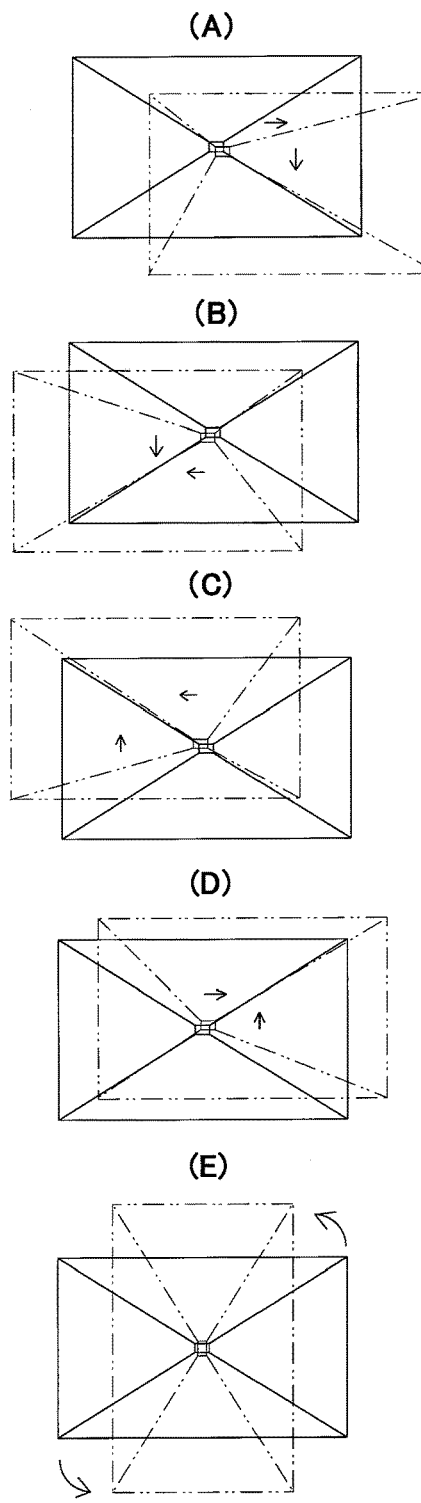
FIG. 14 is a diagram illustrating movement and rotation of a projected video caused by movement of a projector main body according to the third embodiment in X-axis and Y-axis directions and rotation of the same around a Z axis.

An example of the movement of the projected video caused by the movement of the portion including the display element in the small-sized projector 30 in the X-axis and Y-axis directions described above is illustrated by using a solid line and a two-dot and dash line in (A) to (D) of FIG. 14. The projection lens 32 is fixed to the diffusion plate 12 or others, and has the invariable position relative to the ceiling or the wall. Therefore, the relative position in the X-axis and Y-axis directions between the display element and the optical axis of the projection lens 32 is changed by the movement of the portion including the display element in the small-sized projector 30. At this time, an amount of movement of the projected video is an amount obtained by multiplying an amount of change in the relative position in the X-axis and Y-axis directions between the display element and the optical axis of the projection lens 32 by a magnification percentage of the projection optical system.

For example, if the display element has a rectangular video display surface having a diagonal length of 0.6 inches while a rectangular video having a diagonal length of 30 inches is projected onto the upper surface 61 of the table or the desk 60 via the projection lens 32, the magnification percentage of the projection optical system is 50. In this case, if the gaps 1301 and 1302 illustrated in FIG. 13 are set so that the portion including the display element in the small-sized projector 30 is movable by a maximum of ±10 mm in the X-axis and Y-axis directions, the amount of movement of the projected video in the X-axis and Y-axis directions becomes ±500 mm at a maximum.

Note that the rotation of the projected video caused by the rotation of the portion including the display element in the small-sized projector 30 around the Z-axis is illustrated by using a solid line and a two-dot and dash line in (E) of FIG. 14. An effect of the rotation of the projected video in the third embodiment is almost similar to those in the first embodiment and the second embodiment.

With respect to the movement of the video, the above-described present third embodiment uses the function of varying the relative position between the display element and the projection optical system as different from the first embodiment and the second embodiment. Therefore, even if an amount of movement of a mechanism inside the main body (shade) 11 is made the same as those in the first embodiment and the second embodiment, a larger amount of movement of the video can be ensured. Accordingly, even if the user has changed the layout of the table or the desk 60 in a room, the video can be more easily projected again onto the upper surface 61 of the table or the desk 60 after the layout change than a case under such construction as changing the fixing position and the fixing direction of the illumination apparatus with the video projection function 10 to the ceiling surface or the wall.

Further, in the above-described present third embodiment, even if the position of the projected video is moved, a relative position between the projection lens 32 and the diffusion plate 12 is fixed. Therefore, enlargement of the opening 14 in the diffusion plate 12 in consideration of the movement range of the projection lens 32 is not required. Accordingly, the size of the opening 14 can be minimized, the dust proofing performance is easier to be enhanced, and the aesthetic outer appearance as the illumination apparatus can be further enhanced.

That is, in the illumination apparatus with the video projection function according to the third embodiment described above, the dust proofing performance can be easier to be enhanced, and the movement range of the projected video can be more favorably magnified while enhancing the ascetic outer appearance as the illumination apparatus.

Fourth Embodiment

Then, as another example in which the position of the projected video can be moved by using the above-described function of varying the relative position between the display element and the projection optical system, an illumination apparatus with a video projection function 10 according to a fourth embodiment will be described in detail below with reference to FIGS. 15 to 17. In the present fourth embodiment, as also illustrated in a top view of (A) in FIG. 15, a side view of FIG. 15(B), and a bottom view of (C) of FIG. 15, a portion including a display element in a small-sized projector 30 is fixed and arranged inside a main body (shade) 11 together with an illumination light source 20 and a power supply unit 80 while a position of a projection lens 32 in the small-sized projector 30 is movable and adjustable. Other components may be structured to be fixed to the main body (shade) 11. Thus, an internal configuration of the illumination apparatus 10 basically includes many similar portions to those illustrated in FIG. 2 described above. Accordingly, detailed description for the similar parts to those illustrated in FIG. 2 is omitted here, and a movement mechanism of a relative position between the small-sized projector 30 and the projection lens 32 which is a feature of the illumination apparatus 10 will be described below with reference to FIGS. 15 and 16.

Figure 16:
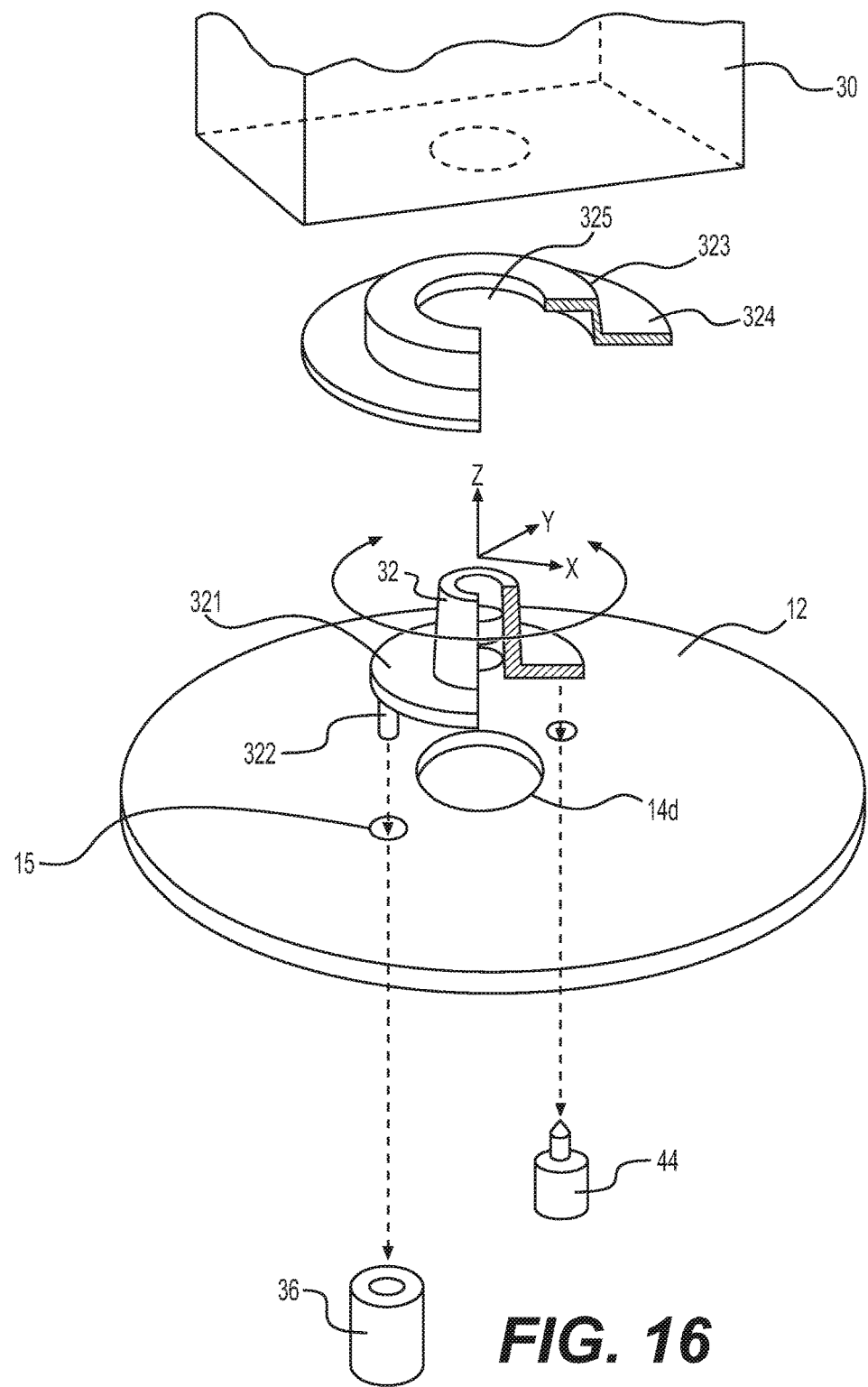
FIG. 16 is a developed perspective view for explaining details of the function of moving the projection lens in the illumination apparatus according to the fourth embodiment.

In the fourth embodiment, as illustrated in FIG. 16, a flange unit 321 is formed at a distal end of a projection lens 32 constituting the small-sized projector 30 arranged inside the main body (shade) 11, and a protrusion (a so-called tab or knob) 322 which can be held by fingers or others is formed in a part of the flange unit 321. Meanwhile, as similar to the second embodiment, an opening 14d having a larger diameter than the diameter of the projection lens is formed in a central portion of a diffusion plate 12 attached to the bottom of the main body (shade) 11 in consideration of movement of the projection lens 32 in X-axis and Y-axis directions. Further, an opening 15 is formed adjacent to the opening 14d. The opening 15 is an opening through which the above-described protrusion 322 is protruded outward when the apparatus is assembled, and its diameter is set to such an extent as to achieve the required movement in the X-axis and Y-axis directions.

In addition, a cover unit 323 serving as a member for covering the flange unit 321 in the projection lens 32 from above is attached to the diffusion plate 12. A flange unit 324 is formed on the bottom of this cover unit 323 as can also be seen from FIG. 16, and a circular opening 325 through which the projection lens 32 is protruded is formed in a central portion of the cover unit 323. In a state in which the projection lens 32 is inserted into the opening 325 passing through the cover unit 323 and is attached on the diffusion plate 12, the projection lens 32 is slid inside a columnar gap formed between the cover unit 323 and the diffusion plate 12 so as to be movable on a horizontal plane in the X-axis and Y-axis directions.

Figure 15A:
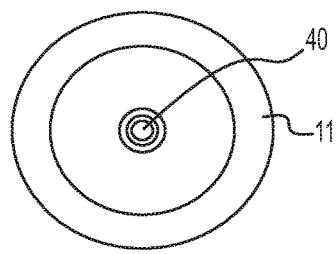
FIG. 15 is a top view, a side view, and a bottom view explaining an internal configuration of the illumination apparatus according to the fourth embodiment of the present invention.
Figure 15B:
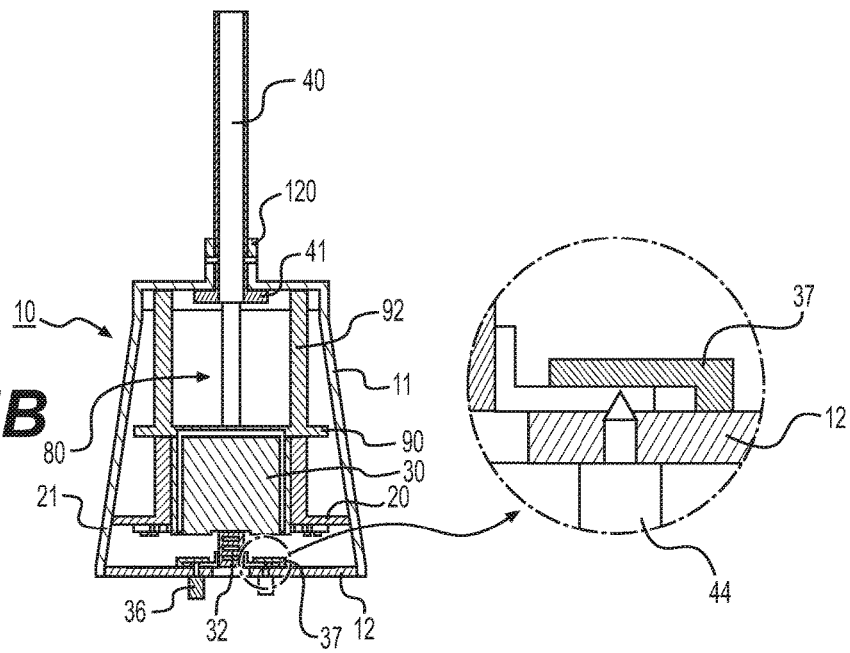
Figure 15C:
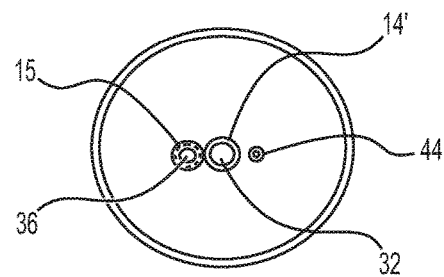

In (B) of FIG. 15, the configuration of the illumination apparatus with the video projection function 10, the configuration having the variable position relative to the holding tool 40 which is the fixing member having the invariable position relative to the ceiling or the wall, is a portion including the projection lens 32 indicated by wide-interval oblique lines in cross section.

In the fourth embodiment, a movement function (also referred to as a movement mechanism) for making a position of a projected video movable is provided. A position fixing function (also referred to as a locking mechanism) of the movement function will be described below. As locking means for fixing the position of the projection lens 32 in the movement mechanism, a fastening screw 36 illustrated in (C) of FIG. 15 may be prepared first at a distal end of the protrusion 322 illustrated in FIG. 16, and the movement mechanism may be locked, i.e., the position of the projection lens 32 may be fixed by tightening the fastening screw 36. Alternatively, as illustrated in (C) of FIG. 15, the movement function may be locked by tightening a fastening screw 44 while providing an opening for the fastening screw 44 at a different position from the protrusion 322. Alternatively, the movement function may be locked by friction caused by sandwiching the flange unit 321 between the cover unit 323 and the diffusion plate 12 without preparing a fastening screw at the distal end of the protrusion 322 from the opening 15. In this case, an urging mechanism such as a spring may be provided between the cover unit 323 and the flange unit 321.

The flange unit 321 may be configured to be movable by a dedicated tool without providing the protrusion 322. In this case, the diffusion plate 12 may be provided with an opening 15, the flange unit 321 may be provided with a dedicated-tool detachable hole, and the position of the projection lens 32 may be moved by inserting the dedicated tool into the dedicated-tool detachable hole only when the user moves the projection lens 32. In this case, it is not required to protrude the protrusion 322 downward from the diffusion plate 12. Therefore, the aesthetic outer appearance as the illumination apparatus can be more favorably maintained.

According to the above-described configuration, video light projected from the projection lens 32 can be moved and adjusted within a larger range in a desired direction by the function of varying the relative position between the display element and the projection optical system caused by the movement of the projection lens 32 on the horizontal plane in the X-axis and Y-axis directions. That is, the projected video can be moved in two-axes directions. In the case, note that the user adjusts the position of the projection lens 32 on the horizontal plane in the X-axis and Y-axis directions by using the protrusion 322 or others after loosening the fastening screw 36 or the fastening screw 44 or others. Then, by retightening the fastening screw 36 or the fastening screw 44, the position of the projection lens 32 is set and fixed. In the locking method by the friction described above, note that the fastening screw is not required.

Figure 17:
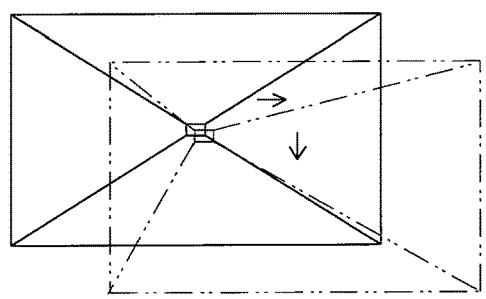
FIG. 17 is a diagram illustrating movement and rotation of a projected video caused by movement of the projection lens according to the fourth embodiment in X-axis and Y-axis directions.
Figure 17:
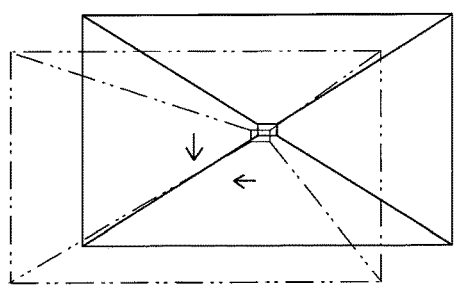
Figure 17:
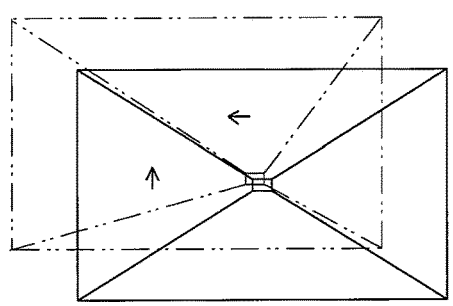
Figure 17:
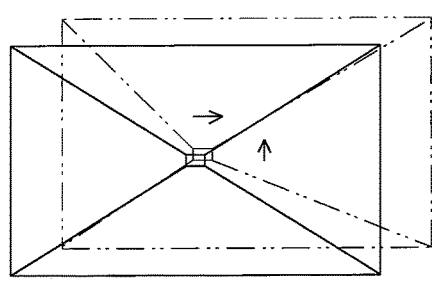

An example of the movement of the projected video caused by the movement of the projection lens 32 in the fourth embodiment in the X-axis and Y-axis directions is illustrated by using a solid line and a two-dot and dash line in (A) to (D) of FIG. 17. By the movement of the projection lens 32, the relative position in the X-axis and Y-axis directions between the display element and the optical axis of the projection lens 32 is changed. At this time, an amount of movement of the projected video is an amount obtained by multiplying an amount of change in the relative position in the X-axis and Y-axis directions between the display element and the optical axis of the projection lens 32 by a magnification percentage of the projection optical system.

For example, when the display element has a rectangular video display surface having a diagonal length of 0.6 inches, and besides, when a rectangular video having a diagonal length of 30 inches is projected on an upper surface of a table or a desk 60 via the projection lens 32, the magnification percentage of the projection optical system is 50. When the diameter of the opening 15, the diameter of the flange unit 321, the inner diameter of the cover unit 323, and others are set so that the projection lens 32 is movable by ±10 mm at a maximum in the X-axis and Y-axis directions, the amount of movement of the projected video in the X-axis and Y-axis directions becomes ±500 mm at a maximum.

Note that the foregoing example has been described in an assumption that the projection lens 32 in the small-sized projector 30 is arranged at respective central portions of the main body (shade) 11 and the diffusion plate 12. However, if the projection lens 32 is at other position, the projection lens 32 may be configured so that respective positions of the opening 14d and the opening 15 formed in the diffusion plate 12 described above together with the attachment position of the projection lens 32 moves to match the position of the projection lens 32.

In the illumination apparatus with the video projection function according to the fourth embodiment described above, the movement range of the projected video can be more favorably enlarged by providing the mechanism of moving the projection lens 32 so that the relative position between the projection optical system and the display element is variable. And, only the projection lens 32 can be made variable while the position of the portion including the display element in the small-sized projector 30 is fixed, and therefore, a structure inside the main body (shade) 11 can be made simpler.

Fifth Embodiment

In the above-described embodiments, particularly the fourth embodiment, description has been made in an assumption that the small-sized projector 30 arranged inside the main body (shade) 11 is fixed. However, in the illumination apparatus with the video projection function according to the fourth embodiment, if a mechanism of making the entire main body (shade) 11 including the small-sized projector 30 rotatable around the Z-axis is further provided, the video can also be rotated in addition to the movement of the video described in the fourth embodiment. An illumination apparatus with a video projection function according to a fifth embodiment will be described below with reference to FIGS. 18 and 19.

As more specific description, the fifth embodiment can be achieved as also illustrated in FIG. 18 by further mounting a rotation mechanism similar to the rotation mechanism described in the first embodiment into an upper part of a main body (shade) 11 in the configuration of the illumination apparatus with the video projection function 10 according to the fourth embodiment. In the case, note that the diameter of the openings 115 respectively formed in the central portions of the double disk units 111 and 112 illustrated in FIG. 5 in the first embodiment may be made almost similar to the diameter of the holding tool 40. That is, in the fifth embodiment, it is not required to secure the gaps 501 and 502 to be large enough to make the main body (shade) 11 movable in X-axis and Y-axis directions as seen in the first embodiment.

That is, according to the present fifth embodiment, by the configuration, not only the movement of the projection lens 32 separated from the small-sized projector 30 on the horizontal plane in the X-axis and Y-axis directions but also the rotation of the entire main body (shade) 11 including the small-sized projector 30 around the Z-axis can be achieved. That is, the projected video can be moved in the two-axes directions and be rotated in one-axis direction.

An example of the movement of the projected video caused by the movement of the projection lens 32 in the fifth embodiment in the X-axis and Y-axis directions is illustrated by using a solid line and a two-dot and dash line in (A) to (D) of FIG. 19. An effect of the movement of the projection lens 32 in the X-axis and Y-axis directions is similar to that in the fourth embodiment.

The rotation of the projected video caused by the rotation of the portion including the display element in the small-sized projector 30 around the Z-axis is illustrated by using a solid line and a two-dot and dash line in (E) of FIG. 19. An effect of the rotation of the projection video is almost similar to those in the first and second embodiments.

The present fifth embodiment described above can achieve the illumination apparatus with the video projection function in which the position of the projected video can be favorably moved within a larger range by the function of varying the relative position between the display element and the projection optical system and in which the projected video can be rotated by the rotation mechanism.

In each of the embodiments described above, an example in which a plane formed by an X-axis and a Y-axis is a horizontal plane has been described. Further, an example in which the Z-axis extends in a vertical direction has been described. However, a movement mechanism on the plane formed by the X-axis and the Y-axis described in each of the embodiments of the present invention is a mechanism for moving a video on a projection surface in an X-direction and a Y-direction. Therefore, this plane may be not limited to a horizontal plane but any plane as long as the plane is in parallel to a video projection surface. The rotation mechanism around the Z-axis described in each of the embodiments of the present invention is a mechanism for rotating the video on the projection surface around the Z-axis. Therefore, the rotation axis serving as the Z-axis may be not limited to a vertical direction but any axis as long as the axis is perpendicular to the video projection surface.

The small-sized projector 30 described in each of the above-described embodiments does not always need to include an entire projector (all a plurality of components constituting the projector). That is, the small-sized projector 30 may be a part of the projector as long as the small-sized projector is a unit including a display element in the projector.

The various illumination apparatuses each with the video projection function according to the various embodiments of the present invention have been described above. However, the present invention is not to be limited to the above-described embodiments but includes various modified examples. For example, in the above-described embodiments, the entire system has been described in detail in order to understandably explain the present invention, and the present invention is not limited to a system including all components described above. Also, a part of the structure of one embodiment can be replaced with the structure of the other embodiment, and besides, the structure of the other embodiment can be added to the structure of one embodiment. Further, the other structure can be added to/eliminated from/replaced with a part of the structure of each embodiment.

EXPLANATION OF REFERENCE CHARACTERS

10 . . . Illumination apparatus with Video projection function, 11 . . . Main body (Housing, Shade), 12 . . . Diffusion plate, 14 and 15 . . . Opening, 20 . . . Illumination light source, 21 . . . Substrate, 30 . . . Small-sized projector, 31 . . . Casing member, 32 . . . Projection lens, 33 . . . Member, 34 . . . Disk-shaped member (Suspended member), 40 . . . Holding tool (Pipe), 41 . . . Flange unit, 42 . . . Fixing member, 43 . . . Screw hole, 44 . . . Fastening screw, 90 . . . Holding plate, 91 and 92 . . . Support pillar, 111 and 112 . . . Disk unit, 115 . . . Opening, 501 and 502 . . . Gap

The invention claimed is:

1. An illumination apparatus which is held by a holding tool for fixing to a ceiling surface or a wall and which emits illumination light, comprising:
    a light source arranged inside a housing for generating the illumination light;
    a diffusion plate attached to a part of the housing, the diffusion plate diffusing the illumination light from the light source;
    a projector which is arranged inside a space formed by the housing and a part of the diffusion plate and which projects a video onto a projection surface; and
    movement means for making the whole or a part of the projector movable in a direction parallel to the projection surface.

2. The illumination apparatus according to claim 1,
    wherein the projector is fixed into a space formed by the housing and the diffusion plate, and
    a position of an integral configuration including the projector, the housing, and the diffusion plate relative to the holding tool is made to be variable in a direction parallel to the projection surface by the movement means.

3. The illumination apparatus according to claim 2,
    wherein the integral configuration including the projector, the housing, and the diffusion plate is made to be rotatable around an axis perpendicular to the projection surface by the movement means.

4. The illumination apparatus according to claim 1,
    wherein positions of the housing and the diffusion plate relative to the holding tool are fixed to be invariable, and
    a position of the projector relative to the holding tool is made to be variable in an in-plane direction parallel to the projection surface by the movement means.

5. The illumination apparatus according to claim 4,
    wherein, inside a space formed by the housing and the diffusion plate, the projector is made to be rotatable around an axis perpendicular to the projection surface by the movement means.

6. An illumination apparatus which is held by a holding tool for fixing to a ceiling surface or a wall and which emits illumination light, comprising:
    a light source arranged inside a housing for generating the illumination light;
    a diffusion plate attached to a part of the housing, the diffusion plate diffusing the illumination light from the light source;
    a projector which is arranged inside a space formed by the housing and a part of the diffusion plate and which projects a video onto a projection surface; and
    movement means for making a position of a projection lens in the projector relative to a display element included in the projector movable in a direction parallel to the projection surface.

7. The illumination apparatus according to claim 6,
    wherein a position of the projection lens relative to the diffusion plate is fixed to be invariable, and a position of a configuration including the display element in the projector relative to the diffusion plate is made to be variable by the movement means.

8. The illumination apparatus according to claim 7, wherein the configuration including the display element in the projector is made to be rotatable around an axis perpendicular to the projection surface by the movement means.

9. The illumination apparatus according to claim 6, wherein a position of the display element included in the projector relative to the diffusion plate is fixed to be invariable, and the movement means for moving the projection lens is attached to a part of the diffusion plate.

10. The illumination apparatus according to claim 9, further comprising means for making an integral configuration including the housing, the projector, and the diffusion plate rotatable around an axis perpendicular to the projection surface.

* * * * *